United States Patent
Tuzel et al.

(10) Patent No.: US 8,718,362 B2
(45) Date of Patent: May 6, 2014

(54) APPEARANCE AND CONTEXT BASED OBJECT CLASSIFICATION IN IMAGES

(75) Inventors: Oncel Tuzel, Cambridge, MA (US); Jaishanker K Pillai, College Park, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 58 days.

(21) Appl. No.: 13/432,998

(22) Filed: Mar. 28, 2012

(65) Prior Publication Data

US 2013/0259371 A1    Oct. 3, 2013

(51) Int. Cl.
*G06K 9/00*    (2006.01)
(52) U.S. Cl.
USPC ......................................................... 382/170
(58) Field of Classification Search
USPC .......................................................... 382/170
See application file for complete search history.

(56) References Cited

U.S. PATENT DOCUMENTS 7,822,696 B2 * 10/2010 Zhang et al. ..................... 706/20

OTHER PUBLICATIONS (Carolina Galleguillos, "Object Categorization using Co-Occurrence, Location and Appearance", 2008, department of Computer Science and Engineering).*
(Carolina Galleguillos, "Context based Object categorization: A Critical survery", Computer Vision and Image Understanding(2010), Elsevier).*
(A Bosch, "Using Appearance and COntext for Outdoor Scene Object Classification", 2005, IEEE).*
(Paul Viola, "Rapid Object Detection Using a Boosted Cascade of Simple Features", 2001, Accepted Conference on Computer Vision and Pattern Recognition).*
(Xinxiao Wu, "Action Recognition using Context and Appearance Distribution Features", 2011, IEEE).*
(Tae-Kyun Kim, "Multiple Classifier Boosting and Tree-Structured Classifiers", 2013, Springer-Verlag berlin Heidelberg).*
(Jitao Sang, "Adaptive Object Classification in Surveillance Sysem by Exploiting Scene Context", 2009, IEEE).*
A. Saxena, M. Sun, A. Y. Ng. "Learning 3-D Scene Structure from a Single Still Image", ICCV workshop on 3D Representation for Recognition (3dRR-07), 2007.
P. Felzenszwalb and D. Huttenlocher. Pictorial structures for object recognition. In Proceedings of the IEEE Conference on Computer Vision and Pattern Recognition, pp. 2066-2073, 2000.
R. Fergus, P. Perona, and A, Zisserman. Object Class Recognition by Unsupervised Scale-Invariant Learning. (2003).
Desai, C., Ramanan, D., & Fowlkes, C. (2009). Discriminative models for multi-class object layout. In IEEE international conference on computer science.

* cited by examiner

*Primary Examiner* — Samir Ahmed
*Assistant Examiner* — Totam Le
(74) *Attorney, Agent, or Firm* — Dirk Brinkman; Gene Vinokur

(57) ABSTRACT

Objects in an image are classified by applying an appearance classifier to the image to determine candidates of the objects and statistics associated with the candidates, wherein the appearance classifier uses a set of windows, and the candidates are in selected windows. Then, a context classifier is applied only to the selected windows of the image to determine an identity, and location of objects in the image.

9 Claims, 1 Drawing Sheet

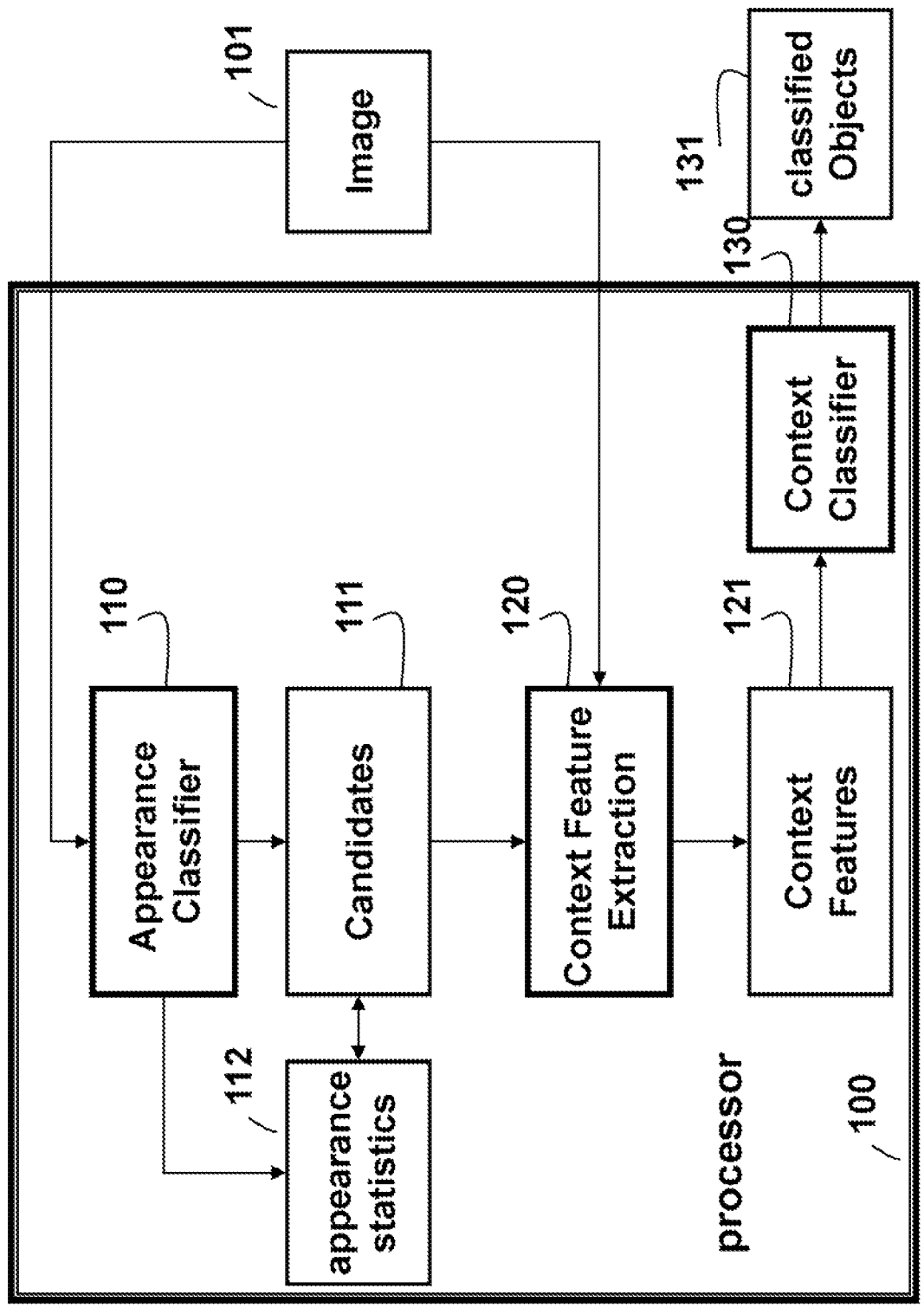

APPEARANCE AND CONTEXT BASED OBJECT CLASSIFICATION IN IMAGES

FIELD OF THE INVENTION

This invention relates generally to computer vision, and more particularly to classifying objects in images acquired by a sensor.

BACKGROUND OF THE INVENTION

Generally, cameras acquire more images and videos than can be viewed and analyzed. Therefore, there is an increasing need for computer based methods and systems that automate the analysis of images and videos. A fundamental task in automated image and video analysis is identification and localization of different classes of objects in scenes acquired by cameras.

The most common approach for object classification uses a scanning window, where a classifier applied to pixels in the window as it is scanned over the image. Typically, the window is rectangular and of a fixed size. The classifier indicates whether or not the object is in the window. If necessary, the image can be resized to fit the object. The resizing is done repeatedly until the resized image matches or is smaller than the window. This brute force search is repeated over all locations and sizes. The method can be repeated for each class of objects.

Those methods effectively only use appearance information available from pixels in the window. However, such approaches fail to utilize the structural information based on both relative appearances and layouts of different objects in the scene with respect to each other, or priors based on an overall object or scene structure.

Several methods are based on context information. Those methods use 3D scene structure to infer a likelihood of that an object is located in the image. For example, to detect people using a camera arranged on a vehicle, the knowledge of the locations of the road, sidewalk and buildings in the image plane can be used to generate per location object likelihoods. Similarly, rough 3D structure of the scene can be inferred from images using camera geometry and the image cues, which can be used to generate object likelihoods. The contextual object likelihoods can then be combined with classifier scores to improve detection performance. However, obtaining scene structure is a difficult task, which limits the usefulness of those methods.

An alternative method searches for parts of the object in the image and combines the parts to detect and localize the object. Those methods combine appearance based classification of object parts and geometric relations into a single classifier. Due to high computational complexity of the joint classification, in parallel, only simple geometric relationships, such as the distances between pairs of object parts, can be used.

Another method uses simple spatial relation based features of different objects, such as "above," "below," "next-to," an "on-top." The relations are combined with appearance features in a multi-class classifier.

SUMMARY OF THE INVENTION

Objects in an image are classified by applying an appearance classifier to the image to determine candidates of the objects and statistics associated with the candidates, wherein the appearance classifier uses a set of windows, and the candidates are in selected windows.

Then, a context classifier is applied only to the selected windows of the image to determine an identity, and location of objects in the image.

BRIEF DESCRIPTION OF THE DRAWING

FIG. 1 is a flow diagram of a method for classifying according to embodiments of the invention.

DETAILED DESCRIPTION OF THE PREFERRED EMBODIMENTS

As shown in FIG. 1, embodiments of our invention provide a method for classifying one or multiple different objects in an image 101 a sensor, e.g., a camera. As used herein, classification means identifying and localizing the objects. The input to our method can be any image, including optical, and range, as well as medical and physics images using other imaging modalities. The method sequentially uses an appearance classifier 110 and a context classifier 130. The steps of the method can be performed in a processor 100 connected to memory and input/output interfaces as known.

In an offline step, we train the appearance classifier, and the context classifier. The appearance classifiers use the "appearance" of pixels in the image as representing a particular class of objects as candidates 111. The classifier can be trained for each class of the objects. The output of the appearance classifier includes statistics 112 for the different classes, locations, sizes, scores, associated with the candidate. The classifier can also output other information to reduce a false positive error rate.

The context classifier uses the candidates and the associated statistics. This classifier can also be trained for each class of objects.

The appearance classifier is applied to a set of windows, for multiple scales, rotations, translations, or selected windows. For each window, appearance features are determined. Then, selected windows are classified as "1" (positive), if the window includes a candidate 111. The location, orientation and size of the window in the image are also provided. In other words, the candidates are the selected windows that are likely to contain an object that can be classified.

For each candidate, we extract 120 object and global context features 121. The object context features encode relative information between candidates. For example, a size of the candidate divided by a mean of the size of all candidates. The global context features encode the candidate information with respect to structure in the scene or image structure, e.g., the location of the candidate in the image plane.

The context classifier is applied to the context features, and the candidates. The candidates that are classified as "1" (positive) by the context classifiers are labeled as classified objects 131, e.g., the identity and location of the objects is known.

Training

The classifiers for a particular object class, such as people or cars, can be trained using any conventional techniques. We use a Support Vector Machine (SVM) for the appearance and context classifiers. The classifiers are trained using a quadratic program solver that requires a set of positive and negative training examples, which are object and non-object windows selected from a collection of training images in a database. The trained classifier outputs a real-valued confidence score, which can be thresholded to obtain a binary output (0/1).

Appearance Features

Various appearance feature vectors can be determined for each window. We have used a combination Histogram of Gradient (HoG) features, and Haar-like features. The histogram represents the appearance statistics of the candidates.

The HoG is a rectangle overlaying the image wherein a gradient magnitude and orientation are determined for each pixel in the rectangle. A set of discrete orientation bins is defined in the range of 0 to 360 degrees. Each bin covers a contiguous range of orientations (angles). The gradient magnitude for each pixel is added to the appropriate bin corresponding to the gradient orientation. This yields a histogram which is used as a feature vector. Typically a non-overlapping set of such rectangular areas are defined within the detection window, and a concatenation of the HoG feature vectors for each rectangular areas is used as the feature vector for classification.

A Haar-like feature is two or more contiguous rectangles overlaying an image for which the values of the pixels inside each rectangle are summed, multiplied by a constant (often 1 or −1) and then combined (added). Haar-like features are extremely fast to compute using an image representation known as an integral image.

Context Features

Object Context Features

The object context feature is any measure that quantifies a relative relation between the candidates. We use: size divided by the mean candidate object size, score divided by the mean score, score divided by a maximal score, location divided by the mean location of candidates, and average distance from all other candidates divided by average of candidate pair-wise distances.

Global Context Features

Any measure that quantifies a relation between the candidate and the scene or image as a whole can be used as the global context feature. We use location in the image plane, size in pixels, for example.

Effect of the Invention

The invention provides a method for classifying one or multiple different objects in an image. The classifying is performed serially by an appearance classifier and a context classifier. The appearance classifier selects candidate object, so that the computations of the context classifier is greatly reduced.

The appearance classifier uses HoGs or Haar-like features, which, are relatively easy to determine.

Both classifiers use appearance and relative and global context features to reduce the false positive error rate by an order of magnitude.

Our context classifier is very efficient because it is applied only to a small set of candidates classified by the appearance classifier, and the features can be determined in O(n) time, where n is a number of candidates.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for classifying objects in an image, comprising the steps of:
    applying an appearance classifier to the image to determine candidates of the objects and statistics associated with the candidates, wherein the appearance classifier uses a set of windows, and the candidates are in selected windows; and
    applying a context classifier only to the selected windows of the image to determine an identity, and location of objects in the image, wherein the steps are performed in a processor, wherein the context classifier uses object context features and global context features and wherein the object context features encode relative information between candidates including a size of the candidate divided by a mean of the size of all candidates, a score divided by a mean score, the score divided by a maximal score, location divided by a mean location of all candidates, and average distance from all other candidates divided by an average of candidate pair-wise distances.

2. The method of claim 1, wherein the statistics include locations, sizes, scores, associated with the candidate.

3. The method of claim 1, wherein the appearance classifier output information to reduce a false positive error rate of the classification.

4. The method of claim 1, wherein the appearance and context classifier are trained for different classes of objects.

5. The method of claim 1, wherein the set of windows are for multiple scales, rotations, and translations.

6. The method of claim 1, wherein the global context features encode information with respect to structure in a scene including the candidates.

7. The method of claim 1, wherein the appearance and context classifier use a Support Vector Machine.

8. The method of claim 1, wherein the appearance classifier uses histograms of gradients.

9. The method of claim 1, wherein the appearance classifier uses Haar-like feature.

* * * * *